United States Patent
Krishnan et al.

(10) Patent No.: US 12,326,867 B2
(45) Date of Patent: *Jun. 10, 2025

(54) METHOD AND SYSTEM OF USING DOMAIN SPECIFIC KNOWLEDGE IN RETRIEVING MULTIMODAL ASSETS

(71) Applicant: Microsoft Technology Licensing, LLC, Redmond, WA (US)

(72) Inventors: Adit Krishnan, Seattle, WA (US); Varun Tandon, Sunnyvale, CA (US); Ji Li, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 31 days.

This patent is subject to a terminal disclaimer.

(21) Appl. No.: 18/158,121

(22) Filed: Jan. 23, 2023

(65) Prior Publication Data

US 2024/0248901 A1 Jul. 25, 2024

(51) Int. Cl.
*G06F 16/2457* (2019.01)
*G06F 16/2455* (2019.01)
*G06F 16/248* (2019.01)

(52) U.S. Cl.
CPC .. *G06F 16/24578* (2019.01); *G06F 16/24556* (2019.01); *G06F 16/248* (2019.01)

(58) Field of Classification Search
None
See application file for complete search history.

(56) References Cited

U.S. PATENT DOCUMENTS 8,250,613 B2   8/2012  Faulkner
10,782,456 B2  9/2020  Schürmann
(Continued)

FOREIGN PATENT DOCUMENTS

EP   3794836 A1    3/2021
WO   2020051249 A1  3/2020

OTHER PUBLICATIONS

U.S. Appl. No. 17/703,552, filed Mar. 24, 2022.
(Continued)

*Primary Examiner* — Yu Zhao
(74) *Attorney, Agent, or Firm* — Novo TechIP International PLLC

(57) ABSTRACT

A system for retrieving multimodal assets using domain-specific knowledge includes receiving a search query for searching for multimodal assets; encoding the search query into a first query representation via a first trained query representation machine-learning (ML) model and a second query representation via a second trained query representation ML model; comparing the first query representation to a plurality of multimodal representations to calculate a first similarity score, each of the plurality of multimodal representations being a representation of one of the plurality of candidate multimodal assets; comparing the second query representation to a plurality of domain-specific representations to calculate a second similarity score, the domain-specific representations being representations of domain-specific data associated with one or more of the plurality of the multimodal representations; calculating a third similarity score based on keyword matching between the domain-specific data and the one or more search terms in the search query; aggregating the first, second and third similarity scores to calculate a total similarity score for each of the plurality of candidate multimodal assets; ranking the plurality of candidate multimodal assets based on the total similarity scores to identify search results for the search query; and providing the identified candidate multimodal assets for display as the search results.

16 Claims, 11 Drawing Sheets

(56) References Cited

U.S. PATENT DOCUMENTS

| | | |
|---|---|---|
| 10,783,456 B2 | 9/2020 | Strope et al. |
| 11,003,856 B2 | 5/2021 | Kiros |
| 11,416,534 B2 * | 8/2022 | Wang .................. G06F 16/355 |
| 11,533,495 B2 | 12/2022 | Jain |
| 11,620,331 B2 | 4/2023 | Kislyuk |
| 11,768,837 B1 | 9/2023 | Newman |
| 2005/0257240 A1 | 11/2005 | Faulkner et al. |
| 2011/0047226 A1 | 2/2011 | Gabriel |
| 2011/0307425 A1 | 12/2011 | Wang |
| 2013/0166543 A1 | 6/2013 | MacDonald et al. |
| 2013/0166587 A1 | 6/2013 | Berry |
| 2015/0034357 A1 | 2/2015 | Dower |
| 2015/0034735 A1 | 2/2015 | Liu et al. |
| 2015/0067541 A1 | 3/2015 | Owens |
| 2015/0278226 A1 * | 10/2015 | Franks ............. G06F 16/24578 707/728 |
| 2015/0347357 A1 | 12/2015 | Maughan |
| 2016/0042050 A1 | 2/2016 | Chen |
| 2016/0092447 A1 | 3/2016 | Venkataraman |
| 2017/0006357 A1 | 1/2017 | Obara |
| 2017/0098283 A1 | 4/2017 | Rajan et al. |
| 2017/0337265 A1 | 11/2017 | Garrett et al. |
| 2018/0068023 A1 | 3/2018 | Douze et al. |
| 2018/0113888 A1 * | 4/2018 | Peña Muñoz ........... G06F 16/56 |
| 2019/0007755 A1 | 1/2019 | Obara |
| 2019/0065492 A1 * | 2/2019 | Cheng .................. G06F 16/435 |
| 2019/0102397 A1 | 4/2019 | Hornkvist |
| 2019/0163766 A1 | 5/2019 | Gulati |
| 2019/0258713 A1 | 8/2019 | Kiros |
| 2019/0258722 A1 | 8/2019 | Guo |
| 2019/0303402 A1 | 10/2019 | Berry |
| 2019/0347556 A1 | 11/2019 | Yim |
| 2020/0413154 A1 | 12/2020 | Obara |
| 2021/0133264 A1 * | 5/2021 | Tiwari .................... H04L 51/02 |
| 2021/0191925 A1 | 6/2021 | Sianez |
| 2021/0264203 A1 | 8/2021 | Fuxman |
| 2021/0295822 A1 * | 9/2021 | Tomkins ............ G06F 16/3338 |
| 2022/0075961 A1 | 3/2022 | Cavallari |
| 2022/0138170 A1 | 5/2022 | Misiewicz |
| 2022/0156298 A1 | 5/2022 | Mahmoud |
| 2022/0245706 A1 | 8/2022 | Chaidaroon |
| 2023/0169110 A1 | 6/2023 | Li |
| 2023/0244727 A1 | 8/2023 | Liu |
| 2023/0306087 A1 | 9/2023 | Krishnan et al. |
| 2023/0325391 A1 | 10/2023 | Li |

OTHER PUBLICATIONS

U.S. Appl. No. 17/716,653, filed Apr. 8, 2022.

"Application as Filed in U.S. Appl. No. 17/538,880", filed Nov. 30, 2021, 41 Pages.

Hassan, et al., "Multi-Modal Information Integration for Document Retrieval", In Proceedings of 12th International Conference On Document Analysis And Recognition, Aug. 25, 2013, pp. 1200-1204.

"International Search Report and Written Opinion Issued in PCT Application No. PCT/US23/010536", Mailed Date: Apr. 26, 2023, 10 Pages.

Notice of Allowance mailed on Jan. 10, 2025, in U.S. Appl. No. 17/703,552, 11 pages.

Notice of Allowance mailed on Sep. 30, 2024, in U.S. Appl. No. 17/716,653, 10 pages.

"Non Final Office Action Issued in U.S. Appl. No. 17/716,653", Mailed Date: Jul. 14, 2023, 21 Pages.

Chi et al., "Zero-Shot Cross-Media Embedding Learning with Dual Adversarial Distribution Network", Institute of Electrical and Electronics Engineers, vol. 30, Issue No. 4, Apr. 2020, pp. 1173-1187.

Final Office Action mailed on Jan. 8, 2024, in U.S. Appl. No. 17/716,653, 28 pages.

Final Office Action mailed on Nov. 9, 2023, in U.S. Appl. No. 17/538,880, 13 pages.

International Search Report and Written Opinion Issued in PCT Application No. PCT/US23/011566, Mailed Date: May 25, 2023, 10 Pages.

Lin, et al., "Learning Cross-Aligned Latent Embeddings for Zero-Shot Cross-Modal Retrieval", In Proceedings of the AAAI Conference on Artificial Intelligence, vol. 34, Issue 7, Feb. 7, 2020, pp. 11515-11522.

Non-Final Office Action mailed on Jul. 30, 2024, in U.S. Appl. No. 17/703,552, 60 pages.

Non-Final Office Action mailed on Jun. 13, 2023, in U.S. Appl. No. 17/538,880, 15 pages.

Non-Final Office Action mailed on May 21, 2024, in U.S. Appl. No. 17/716,653, 38 pages.

Notice of Allowance mailed on Mar. 18, 2024, in U.S. Appl. No. 17/538,880, 10 pages.

* cited by examiner

METHOD AND SYSTEM OF USING DOMAIN SPECIFIC KNOWLEDGE IN RETRIEVING MULTIMODAL ASSETS

BACKGROUND

It is common for users of digital devices to search for digital content for a variety of reasons. For example, users may search for content that they can use in creating their own documents. Searching for text content can often be conducted quickly and efficiently. However, in addition to text, there are many types of visual content and/or multimodal content that include two or more different types of content. For example, many digitally designed documents such as cards, posters, design templates and the like include multiple different types of content (e.g., text, images, GIFs., icons, illustrations, etc.). Searching for and retrieving a desired multimodal content is, however, a complex and challenging task.

Moreover, training machine-learning (ML) models that can search for and identify content, is often difficult, as the number of content available for recommendations can be large and new content may be added on a regular basis. Furthermore, ML models that are trained to identify multimodal items based on semantic knowledge of the content of each multimodal item do not have domain specific knowledge of the application in which the item is being used. As a result, the models may provide search results that are not relevant for the particular application the user is interested in.

Hence, there is a need for improved systems and methods of locating and retrieving multimodal content in various applications.

SUMMARY

In one general aspect, the instant disclosure presents a data processing system having a processor and a memory in communication with the processor wherein the memory stores executable instructions that, when executed by the processor, cause the data processing system to perform multiple functions. The function may include receiving a search query for searching for one or more multimodal assets from among a plurality of candidate multimodal assets; encoding the search query into one or more query representations via a trained query representation ML model; comparing the one or more query representations to a plurality of multimodal representations to calculate a first similarity score for one or more of the plurality of the candidate multimodal assets, each of the plurality of multimodal representations being a representation of one of the plurality of candidate multimodal assets; comparing the one or more query representations to a plurality of domain-specific representations to calculate a second similarity score for one or more of the plurality of the candidate multimodal assets, the domain-specific representations being representations of domain-specific data associated with one or more of the plurality of the multimodal representations; calculating a third similarity score for one or more of the plurality of the candidate multimodal assets based on keyword matching between the domain-specific data and one or more terms in the search query; aggregating the first, second and third similarity scores to calculate a total similarity score for one or more of the plurality of candidate multimodal assets; ranking the plurality of candidate multimodal assets based on the total similarity scores to identify one or more of the plurality of candidate multimodal assets as search results for the search query; and providing the identified one or more of the plurality of the candidate multimodal assets for display as the search results.

In yet another general aspect, the instant disclosure presents a method for retrieving one or more multimodal assets using domain-specific knowledge. In some implementations, the method receiving a search query for searching for one or more multimodal assets from among a plurality of candidate multimodal assets, the search query including one or more search terms; encoding the search query into a first query representation via a first trained query representation ML model and a second query representation via a second trained query representation ML model; comparing the first query representation to a plurality of multimodal representations to calculate a first similarity score for one or more of the plurality of the candidate multimodal assets, each of the plurality of multimodal representations being a representation of one of the plurality of candidate multimodal assets; comparing the second query representation to a plurality of domain-specific representations to calculate a second similarity score for one or more of the plurality of the candidate multimodal assets, the domain-specific representations being representations of domain-specific data associated with one or more of the plurality of the multimodal representations; calculating a third similarity score for one or more of the plurality of the candidate multimodal assets based on keyword matching between the domain-specific data and the one or more search terms in the search query; aggregating the first, second and third similarity scores to calculate a total similarity score for each of the plurality of candidate multimodal assets; ranking the plurality of candidate multimodal assets based on the total similarity scores to identify one or more of the plurality of candidate multimodal assets as search results for the search query; and providing the identified one or more of the plurality of the candidate multimodal assets for display as the search results.

In a further general aspect, the instant application describes a non-transitory computer readable medium on which are stored instructions that when executed cause a programmable device to perform functions of receiving a search query for searching for one or more multimodal assets from among a plurality of candidate multimodal assets; encoding the search query into one or more query representations via a trained query representation ML model; comparing the one or more query representations to a plurality of multimodal representations to calculate a first similarity score for one or more of the plurality of the candidate multimodal assets, each of the plurality of multimodal representations being a representation of one of the plurality of candidate multimodal assets; comparing the one or more query representations to a plurality of domain-specific representations to calculate a second similarity score for one or more of the plurality of the candidate multimodal assets, the domain-specific representations being representations of domain-specific data associated with one or more of the plurality of the multimodal representations; calculating a third similarity score for one or more of the plurality of the candidate multimodal assets based on keyword matching between the domain-specific data and one or more terms in the search query; aggregating the first, second and third similarity scores to calculate a total similarity score for one or more of the plurality of candidate multimodal assets; ranking the plurality of candidate multimodal assets based on the total similarity scores to identify one or more of the plurality of candidate multimodal assets as search results for the search query; and providing the identified one or more of the plurality of the candidate multimodal assets for display as the search results.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
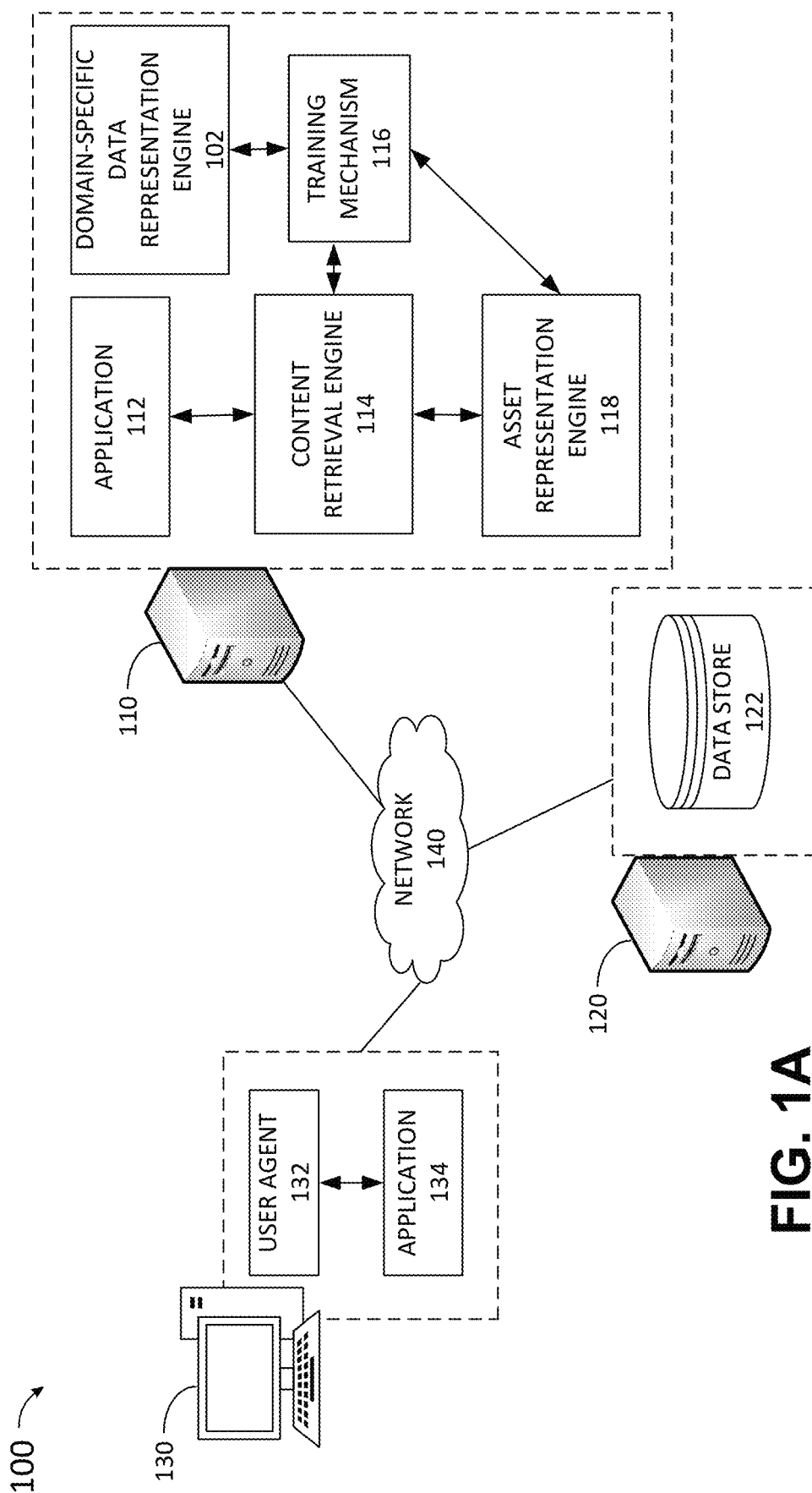
FIG. 1A depicts an example system upon which aspects of this disclosure may be implemented.

Many currently used software applications enable users to search for content and/offer content recommendations to users in order to assist the users create a document and/or improve the quality of a document they are working on. To make the document more aesthetically pleasing or interesting, the user may choose to add visual content to the document. Some applications enable a user to use templates to create a desired document. For example, some documents such as flyers, invitations and the like may be developed by using pre-made templates. A template may include many different types of content. For example, a template for a birthday invitation card often includes text, as well as images, Graphical Interchange Formats (GIFs), icons, and illustrations. Other templates may include videos, emoticons, vector graphics, and/or any combination of these contents. Template, as used herein, refers to any document that can be used as a building block for creating a new document.

Searching for multimodal content, however, is a complex process, as most current search systems rely on text queries to conduct a search. However, many multimodal documents do not contain textual content. Even if a multimodal document contains text, the text may not be representative of all the different types of content present in the document, and as such may not provide reliable search results. To address these issues, some currently available search and retrieval systems use multimodal tensor-to-tensor ranking that analyzes and makes use of the multiple types of content in a document to provide search results. These systems make use of semantic knowledge of the content of documents to identify documents that are relevant to a search query. While these systems are useful in taking into account various types of content in documents when conducting a search, semantic knowledge of content alone does not always provide reliable search results. This is because different applications have domain specific requirements, descriptive language, and specifications. For example, presentation templates may be described using terminology such as professional presentation, marketing presentation, and education presentation, while designer templates make use of terminology such as celebration, social media post, promotion and the like to describe the type of content being generated or searched for. When a user utilizes such terminology to search for content, systems that only take into semantic content of the documents cannot provide search results that correspond with the search request. That is because currently availably searching systems are generic systems that do not take into account domain specific knowledge. Thus, there exists a technical problem of lack of adequate mechanisms for taking domain specific knowledge into account when conducting a search for multimodal content.

Training each search system to take domain specific knowledge into account, however, is an expensive and time-consuming effort. That is because the current ML models for searching multimodal content are large models that require extensive training. Training each of such models for each application is thus challenging and expensive. Furthermore, new multimodal content is often being regularly added to content databases and the terminology used to describe the content may change from time to time. If the ML models were to be trained for domain specific knowledge, they would need to be continually retrained and updated to provide accurate outputs. This requires significant cost and labor. Thus, there exists another technical problem of lack of mechanisms for efficiently training the currently available models for taking domain specific knowledge into account when searching for multimodal content.

To address these technical problems and more, in an example, this description provides technical solutions for a system and method that offers improved ability to search for multimodal design documents based on user search queries by using a hybrid retrieval system that utilizes content of multimodal documents as well as human-annotated data. This is achieved by utilizing a multimodal document search architecture that combines a novel set of human-annotated data as domain expertise with neural representations of content of the multimodal documents to search for and retrieve documents. In addition to using a multimodal embedding that represents semantic content of the documents, the technical solution makes use of domain-specific embeddings and keyword matching responsive to a user search query to identify multimodal design documents that are relevant to the user's search. This may involve use of a multimodal tensor-to-tensor ranking framework to obtain tensor and/or summary embeddings for documents in a content library. Furthermore, the system makes use of human generated data for template documents in a specific domain to train a domain specific text-to-text model that identifies associations between terminology used to describe and/or label documents in that domain. The trained domain specific model is then used to create domain-specific embeddings for document available in a content library of that specific domain. The domain-specific embeddings are used in addition to keyword matching to identify documents that correspond to a user's search query. These outputs are integrated with the output of the semantic models in a signal aggregation and weighting module to generate a final ranked search result of documents that match the user's query. The use of this framework provides a mechanism for adding new documents to asset libraries in a zero-shot manner that does not require labeling and can be performed quickly and efficiently. Searching via the content retrieval engine may be provided by one or more applications that offer searching via text and/or other types of queries. The search features are provided via a user interface (UI) screen that enables the user to perform a search and view search results and/or provides content recommendations for inserting into or utilizing in creation of a document. In this manner, the technical solution provides a searching and retrieval system for multimodal assets that can search for multimodal content in an efficient and accurate manner, provides an efficient mechanism for adding new assets, is user friendly and provides highly accurate results in a given domain.

The technical solution described herein addresses the technical problem of inadequate, inefficient and/or inaccurate mechanisms for searching for multimodal content in different domains and achieves technical effects by providing a system and method for intelligently locating and retrieving multimodal assets that uses domain specific knowledge in addition to semantic knowledge of content. The technical solution allows a user to navigate quickly and efficiently search for, access and review search results of relevant multimodal and/or different types of content, and therefore improves graphical user interfaces for electronic devices. The technical effects include (1) improving the efficiency of using an electronic device to search for multimodal content using text input; (2) improving the efficiency of searching for content in asset libraries containing a significantly large number of assets by providing a two-stage ranking solution that quickly reduces the candidate asset space in an order of magnitudes (e.g., from millions of assets to thousands in a few milliseconds); (3) improving the efficiency of adding new content to asset libraries by providing a mechanism for adding new content in a zero-shot manner that does not require labeling and can be performed quickly and efficiently; and (4) increasing relevancy of search results displayed to the user by using a multimodal tensor-to-tensor ranking framework that takes into account domain-specific knowledge.

As will be understood by persons of skill in the art upon reading this disclosure, benefits and advantages provided by such implementations can include, but are not limited to, a technical solution to the technical problems of lack of mechanisms for efficient and user-friendly searching of multimodal assets that are relevant to a specific domain. Technical solutions and implementations provided herein offer a mechanism for vectorizing multimodal content using different representation models, vectorizing domain-specific data associated with documents in a specific domain and then utilizing the vectorized content, vectorized domain-specific data and keyword searching in combination to provide reliable search results. The benefits made available by these technology-based solutions provide a user-friendly mechanism for searching for multimodal and/or different types of assets, reduced memory, processing and bandwidth requirements for training the models associated with the searching, storing and running the searching systems and updating the asset libraries and search models.

As used herein, the terms "multimodal content," "multimodal document" or "multimodal asset" may refer to an electronic document that includes different types of content. The different types of content include texts, images, videos, GIFs, icons, emoticons, vector graphics, illustrations and the like. The term "content asset" or "asset" as used herein may refer to any type of electronic document that can be provided as a retrievable asset from a library. Examples of assets include images, videos, GIFs, icons, emoticons, vector graphics, illustrations and multimodal content (e.g., templates). Furthermore, as used herein, the term "textual input" may refer to an input received via an input/output device of a computer device, where the input includes alphanumeric text or other characters. The term "search query" may refer to input data provided as a query for which a search should be conducted. The term domain-specific knowledge may refer to human knowledge associated with a specific domain (e.g., particular applications) that can be obtained when a user generates, modifies or adds an asset to an asset library.

FIG. 1A illustrates an example system 100, upon which aspects of this disclosure may be implemented. The system 100 includes a server 110, which itself includes an application 112, a content retrieval engine 114, an asset representation engine 118, a domain-specific data representation engine 102, and a training mechanism 116. While shown as one server, the server 110 may represent a plurality of servers that work together to deliver the functions and services provided by each engine or application included in the server 110. In some implementations, the server 110 operates as a cloud-based server for offering content retrieval services in one or more applications such as application 112 and/or application 134. In other implementations, the server 110 operates as a shared resource server located at an enterprise accessible by various computer client devices such as a client device 130.

The server 110 includes and/or executes a content retrieval engine 114, which receives a request for content from an application such as the application 112 or 134 and processes the request by identifying one or more assets that correspond with the request. The request may be an explicit search request submitted by a user via a UI associated with the application 112 or 134. Alternatively, the request may be transmitted automatically via the application 112 or 134 to provide automatic content recommendations to the user. For example, the application 112 or 134 may examine the content of a document a user is interacting with, determine based on the actions of the user and/or other parameters that the user is creating content, identify keywords, formatting and/or other features of the content, and create a search query for content based on some of the content of the document and/or contextual data. This may be done by utilizing one or more ML models that perform NLP and/or other functions to automatically create one or more search queries for a document and/or user. The search query includes textual input such as text keywords and/or other types of input. For example, the query may include one or more type of data from the document the user is working on (e.g., text, image, icon, illustration, etc.).

In some implementations, the content retrieval engine 114 includes separate modules for processing different types of queries. For example, the content retrieval engine 114 may include different modules from processing text queries, image queries, icon queries, and the like. Furthermore, the content retrieval engine 114 includes an element for comparing the processed query data with processed assets to identify one or more assets that correspond with the query. One or more modules and elements of the content retrieval engine 114 include one or more ML models. The internal structure of and data flow between the various elements of the content retrieval engine 114 is discussed in greater detail with respect to FIGS. 1B-1D.

One or more ML models implemented by the content retrieval engine 114, asset representation engine 118 and/or domain-specific data representation engine 102 are trained by the training mechanism 116. The training mechanism 116 may use training datasets stored in the data store 122 to provide initial and ongoing training for each of the models. Alternatively, or additionally, the training mechanism 116 may use training data sets from elsewhere. In some implementations, the training mechanism 116 uses labeled training data to train one or more of the models via deep neural network(s) or other types of ML models. In other implementations, the training mechanism 116 uses unlabeled training data. The initial training is performed in an offline stage. Additionally, and/or alternatively, the one or more ML models may be trained using batch learning.

As a general matter, the methods and systems described herein may include, or otherwise make use of one or more ML model to perform natural language processing (NPL), vectorize different types of data, analyze content and/or locate search results. ML generally involves various algorithms that can automatically learn over time. The foundation of these algorithms is generally built on mathematics and statistics that can be employed to predict events, classify entities, diagnose problems, and model function approximations. As an example, a system can be trained using data generated by an ML model in order to identify patterns in different types of assets, determine associations between various words and objects, identify keywords and/or classify content. Such training may be made following the accumulation, review, and/or analysis of data over time. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model is referred to as "training" or "learning." The training system includes and/or has access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models are selected based on factors such as, but not limited to, accuracy, computational efficiency, and/or power efficiency. In some implementations, a single trained ML model is produced.

The training data can be occasionally updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models, care is taken to comply with privacy guidelines and regulations. For example, options may be provided to seek consent (e.g., opt-in) from users for collection and use of user data, to enable users to opt-out of data collection, and/or to allow users to view and/or correct collected data.

The asset representation engine 118 operates to convert a content asset into a numerical dense vector embedding. In an example, the asset representation engine 118 can convert different types of assets including multimodal assets to vector embeddings. To achieve this, the asset representation engine 118 makes use of separate ML models for each type of asset. For example, the asset representation engine 118 may include an ML model for converting images to vector representations, another ML for converting icons to vector representations, yet another ML model for converting illustrations to vector representations. Further details regarding the operation of the asset representation engine is provided in greater detail with respect to FIG. 1B.

The domain-specific data representation engine 102 operates to convert human-annotated data associated with each assert in an asset library into numerical vector representations that can be later used to identify associations between a search query and the assets in the asset library. To achieve this, the domain-specific data representation engine 102 makes use of trained ML models that have been trained based on data pairs of likely terms, sentences and/or phrases used to describe or label assets in a specific domain (e.g., templates in a presentation application or image templates in a design application). Further details regarding the operation of the asset representation engine is provided in greater detail with respect to FIG. 1C.

The system 100 also includes a server 120 which is connected to or includes the data store 122 which functions as a repository in which databases relating to training models, asset libraries, vectorized representations of domain-specific data and/or vectorized representations of assets may be stored. Although shown as a single data store, the data store 122 may be representative of multiple storage devices and data stores which are accessible by one or more of the content retrieval engine 114, asset representation engine 118, domain-specific data representation engine 102, training mechanism 116, and application 112.

The client device 130 is connected to the server 110 via a network 140. The network 140 may be a wired or wireless network(s) or a combination of wired and wireless networks that connect one or more elements of the system 100. The client device 130 can be a personal or handheld computing device having or being connected to input/output elements that enable a user to interact with various applications (e.g., application 112 or application 134). Examples of suitable client devices 130 include but are not limited to personal computers, desktop computers, laptop computers, mobile telephones, smart phones, tablets, phablets, smart watches, wearable computers, gaming devices/computers, televisions, and the like. The internal hardware structure of a client device is discussed in greater detail with respect to FIGS. 6 and 7.

The client device 130 includes a local application 134. The application 134 is a computer program executed on the client device that configures the device to be responsive to user input to allow a user to interactively create, edit, and/or review a document. The application 134 also enables the user to interactively submit a search query and receive search results and/or content recommendations. Examples of suitable applications include, but are not limited to, a word processing application, a presentation application, a note taking application, and a communications application, and a design application.

In some examples, the application used to submit a search query and/or receive content recommendations is executed on the server 110 (e.g., application 112) and provided via an online service. In some implementations, web applications communicate via the network 140 with a user agent 132, such as a browser, executing on the client device 130. The user agent 132 provides a user interface that allows the user to interact with the application 112. User data from the application 134 or application 112 is provided via the network 140 to the content retrieval engine 114 for use in providing multimodal asset search results.

Figure 1B:
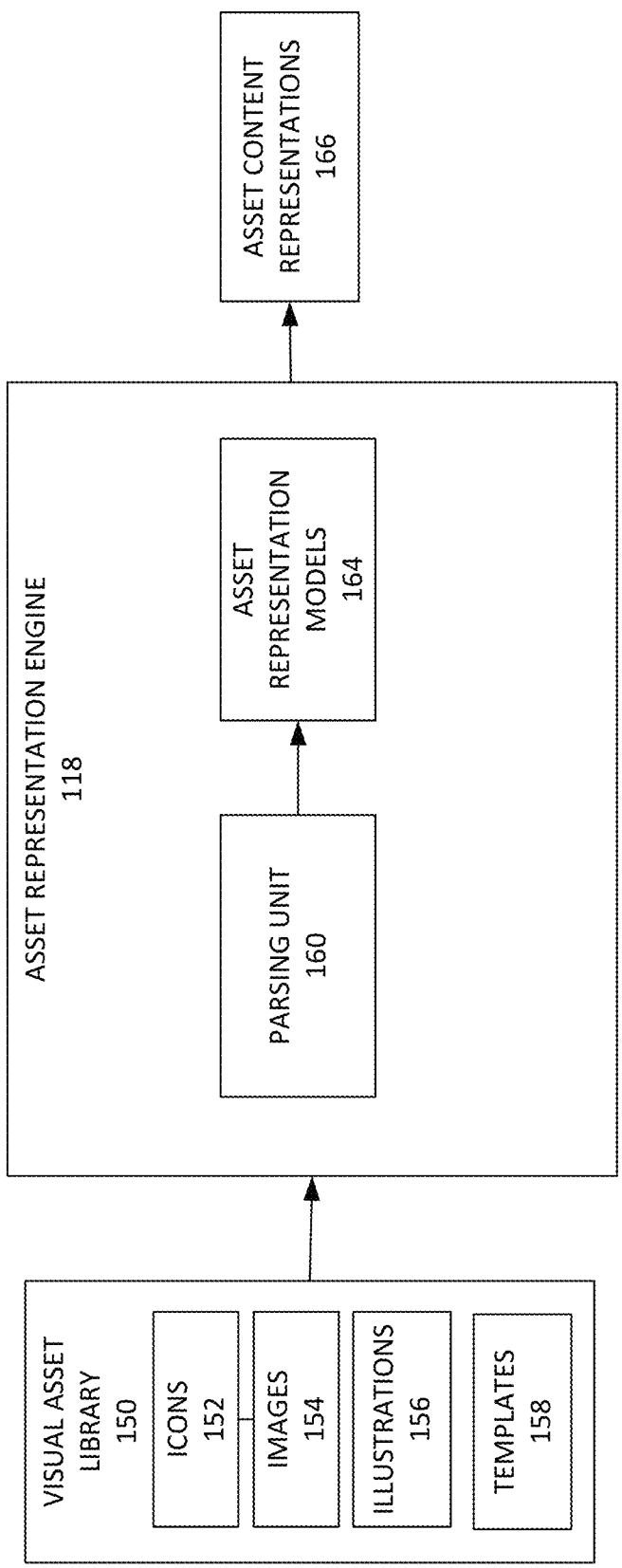
FIG. 1B depicts an example data flow between some elements of an example system upon which aspects of this disclosure may be implemented.

FIG. 1B depicts an example of some of the elements involved in generating asset representations. Assets in one or more visual asset libraries such as the visual asset library 150 are supplied to the asset representation engine 118 such that they can be converted to asset representations for efficient searching. The visual asset library 150 is stored in a storage medium such as the storage server 120 of FIG. 1A (e.g., in data store 122). Alternatively, different portions of the visual asset library 150 are stored in different storage mediums. The visual asset library 150 may include a vast library of visual assets (e.g., millions or thousands of visual assets), which may include many different types of visual assets. In an example, the visual asset library includes an icons library 152, an images library 154, an illustrations library 156, and a templates library 158. However, many other types of visual assets may be included in the visual asset library 150 (e.g., GIFs, illustrations, emoticons, etc.). Each of the icons' library 152, images' library 154, illustrations' library 156, and templates' library 158 includes a large number of visual assets. The templates library 158 may include multimodal assets (e.g., templates) that each contain two or more different types of content (e.g., text, image, icons, illustrations, etc.).

The asset representation engine 118 includes a parsing unit 160 for parsing the content of multimodal assets into the different types of content that form the assets. For example, a template (e.g., birthday invitation digital card) containing two text portions (e.g., two phrases), an image and an illustration may be parsed into the different types of content. This may be achieved by utilizing one or more ML models that analyze the content of a document and identify and parse different types of content within the document. The parsed content is then provided to asset representation models 164 for converting the content to vector representations. The asset representation models 164 are trained representation models for converting different types of content into vector representations. In an example, the asset representation models 164 include a text representation model, an image representation model, an icon representation model and an illustration representation model. Many other different type of representation models may also be included to convert other types of content (e.g., videos, emoticons, GIFs, etc.) to vector representations. These models convert semantic information about each of the contents into vector representations.

The asset representation models 164 processes the asset libraries and/or parsed content to convert the constituent content to embedding vectors which may then be stored in a matrix/tensor format to facilitate matching and selection at runtime. In an example, the image representation model, icon representation model and/or illustration representation models of the visual asset representation model 164 are Shifted Window (SWIN) Transformers. As is known in the art, a SWIN transformer is a type of vision transformer that builds hierarchical feature maps by merging image patches in deeper layers. These models convert the visual content of multimodal assets (e.g., visual content of templates 158) and/or visual assets (e.g., icons 152, images 154 and illustrations 156) to a multi-dimensional vector space (e.g., 256 dimensions) in the same vector space. The vector spaces have the same number of dimensions as the vector space into which the search query is converted. Thus, the visual assets in the visual asset library 150 are encoded into one or more vector embeddings. These vector embeddings are provided as an output of the asset representation models 164. The asset representation engine 118 provides these outputs as asset content representations 166 for storage and/or further processing.

In some implementations, the asset representation engine 118 includes additional elements for generating a tensor from the vector representations. A tensor refers to a mathematical object that is used to describe a multilinear relationship between sets of mathematical objects such as objects related to a vector space. Furthermore, the asset representation engine 118 may include an element for summarizing the generated tensors and an indexing module for generating indexes from the summarized tensors. The details of tensor generation, summarization and indexing are discussed in U.S. patent application Ser. No. 17/703,552, entitled "Method and System of Retrieving Multimodal Assets," which is incorporated herein in its entirety.

The process of converting a visual asset to a vector embedding occurs once. Thus, when the asset representation models 164 are trained, they process the visual asset library 150 to convert the visual assets to the content representations 166. This process does not need to be repeated in the future unless new visual assets are added to the visual asset library 150. When new assets are added to one of the icons' library 152, images' library 154, illustrations' library 156 and/or templates' library 158 or a new type of visual asset is added to the visual asset library 150, the new assets can be process in a zero-shot manner. This means that any new visual asset (e.g., new templates, images, videos, etc.) can be directly converted into encodings by applying the asset representation models 164 to the new asset. Thus, adding new assets to the library does not require expensive labeling of assets. Furthermore, there is no need for updating, changing, or retraining the asset representation models 164, when new assets are added. Still further, the process of adding new assets is an inexpensive computational operation which can occur offline. By using the asset representation models 164 to convert visual assets into vector encodings, the visual asset library 150 can be easily scaled to millions of assets effortlessly. As such, by utilizing the asset representation models 164, the technical solution significantly improves the process of adding new assets to visual asset libraries and locating and retrieving a desired visual asset. The asset content representations 166 are stored in an asset representation library that can be accessed by multiple applications/servers as needed to provide asset retrieval.

Figure 1C:
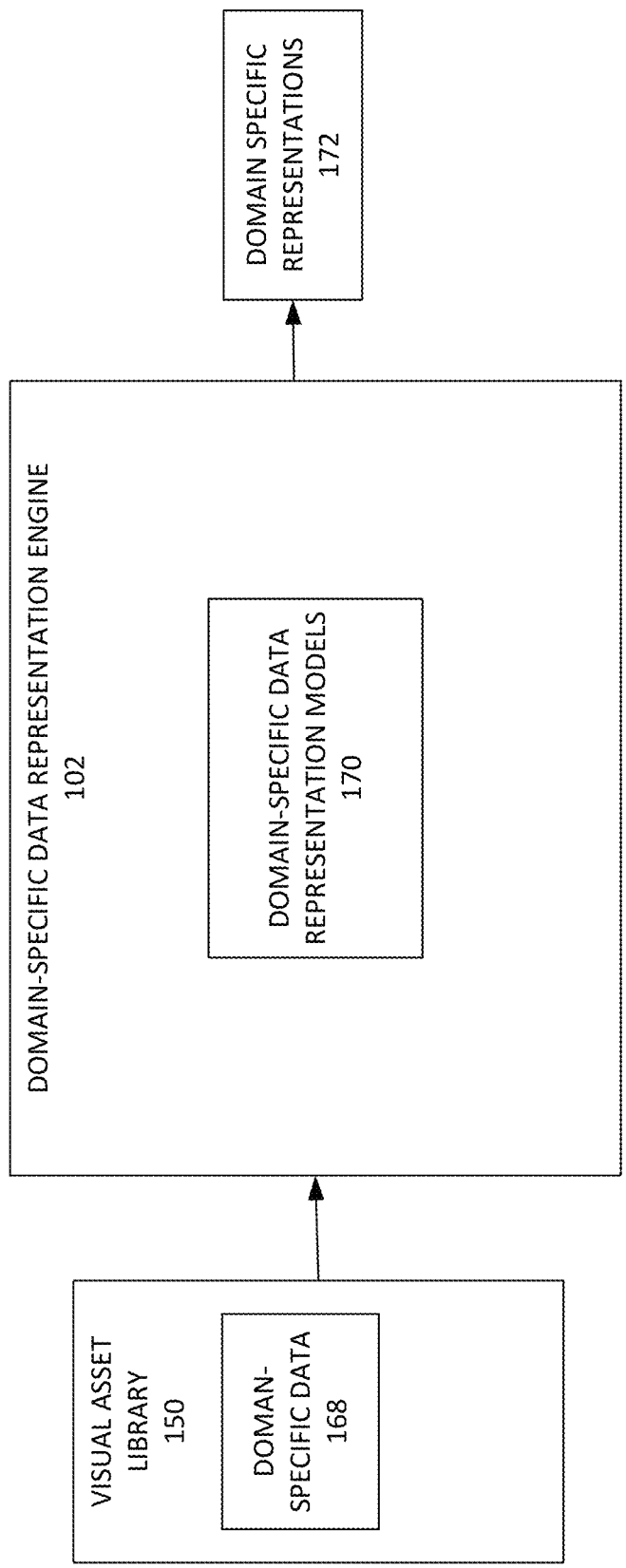
FIG. 1C depicts an example of some of the elements involved in generating domain-specific representations.

FIG. 1C depicts an example of some of the elements involved in generating domain-specific representations. Assets in one or more visual asset libraries such as the visual asset library 150 may include domain-specific data 168. The domain-specific data 168 includes a list of subject-expert annotations for one or more assets in the asset library 150. The annotations may be provided by content creators in the form of keywords or other selections. For example, when new content is created or added to an asset library, a person adding the content to the library may be required to fill out a form having specific fields related to the content. These fields are domain specific and may change from one domain to another (e.g., from one type of asset to another). For example, presentation templates created for a presentation application have different fields related to the format, style, design, intended use and the like of the presentation than design templates used in a graphical design application. Thus, each domain has a predefined information schema associated with the domain to accurately capture information related to the assets used in that domain for the specific search application and domain. An example of an annotation schema for a specific domain is provided with respect to FIG. 2, which is discussed in more detail below. In some implementations, the domain-specific data is stored as metadata with each asset in an asset library. In other implementations, the domain-specific data is stored separately from the assets and may be stored in a separate location.

The domain-specific data 168 is provided to the domain-specific data representation engine 102 which includes one or more domain-specific data representation models 170. Each domain-specific data representation model 170 is a trained ML model for encoding textual inputs into text vector embeddings for a given domain. Thus, each data representation model 170 converts text in the domain-specific data into vector embeddings in a vector space. In an example, each text segment is converted to a multi-dimensional vector space (e.g., 256 dimensions).

In some implementations, the domain-specific data representation model 170 incorporates the Turing text model. However, other text representation models may be used. In an example, the domain-specific data representation model 170 is a pretrained Turing Universal Language representation (T-NLR) model (e.g., T-NLRv3) which is fine-tuned with domain-specific data pairs to train the model for identifying associations between text pairs in the given domain. The details of training the domain-specific data representation model 170 are discussed in more detail with respect to FIG. 3.

The domain-specific data representation model 170 receives the domain-specific data 168 and provides the domain-specific representations 172 as an output. The domain-specific representations 172 may be stored in the same asset representation library that stores the content representations generated by the asset representation engine 118 or they may be stored in a separate representation library. The domain-specific representation library can be accessed by multiple applications/servers as needed to provide asset retrieval. In this manner, in addition to utilizing asset representations that provide information about the content of the assets, expert knowledge regarding the assets in the library is also used to tailor the search results to assets that are more likely to correspond to the user's intent in a given domain.

Figure 1D:
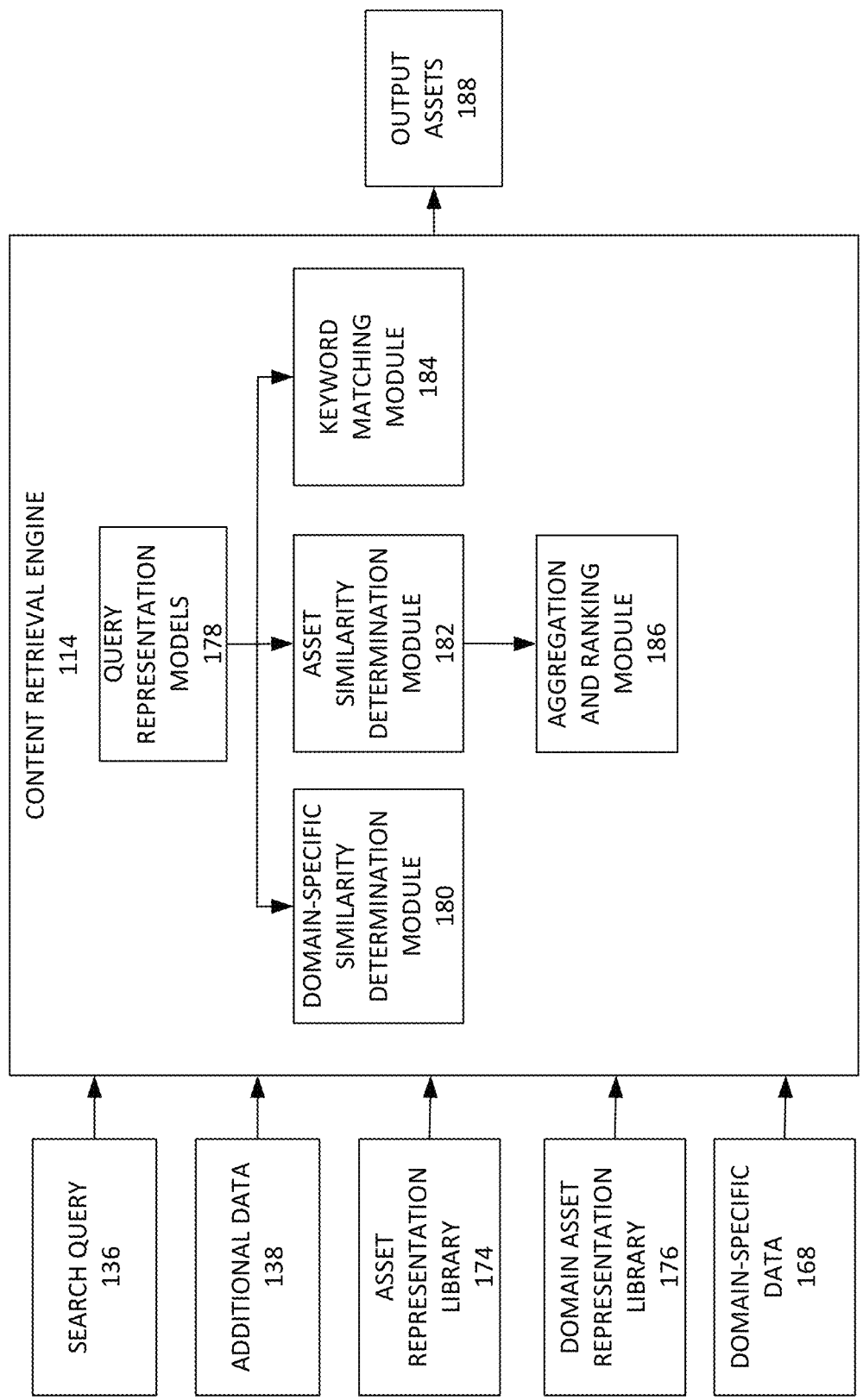
FIG. 1D depicts an example data flow between some elements of an example system upon which aspects of this disclosure may be implemented.
Figure 1E:
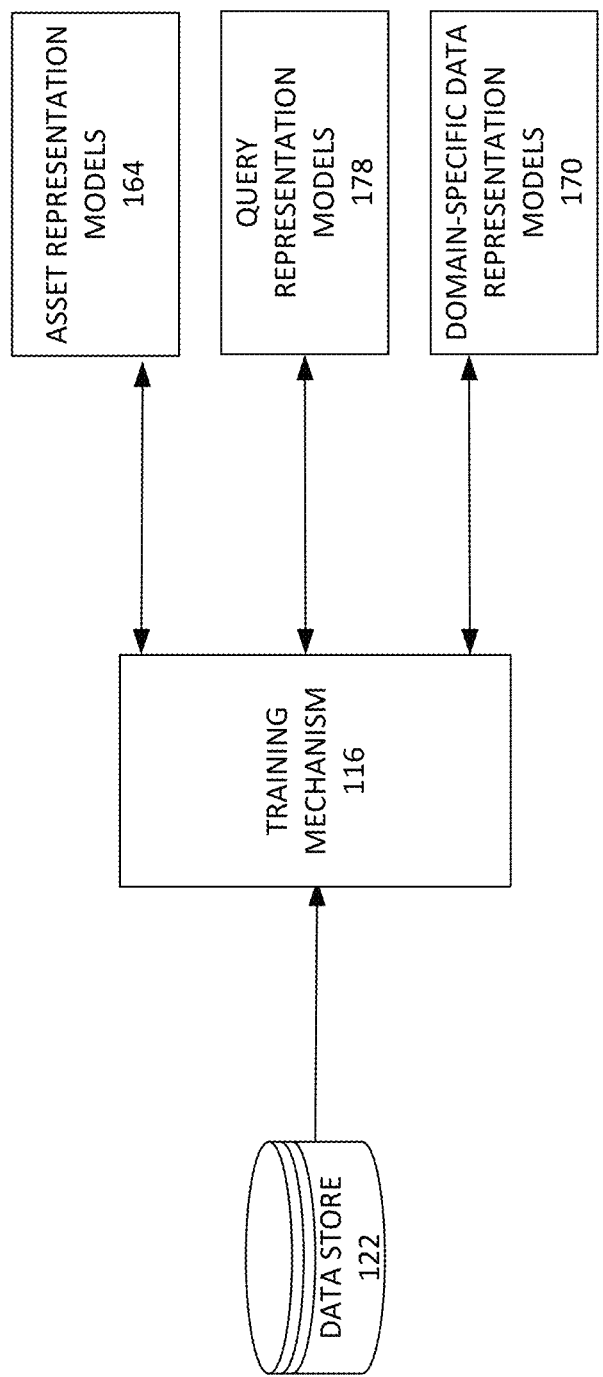
FIG. 1E depicts an example of how one or more ML models used by a content retrieval engine are trained.

FIG. 1D depicts an example of data between some of the elements of the system 100. The content retrieval engine 114 includes a query representation unit 178, domain-specific similarity determination module 180, asset similarity determination module 182, keyword matching module 184, and an aggregation and ranking module 186. A search query 136 may be received via an application that provides functionality for searching for and retrieving assets such as multi-modal assets. As discussed above, the search query 136 may be submitted by a user (e.g., explicit search request) or it may be generated by the application (e.g., implicit search request). The search query 136 includes text that specifies parameters for the desired assets. For example, the search query 136 may include one or more keywords or phrases related to a topic the user is interested in (e.g., waterfalls, dogs playing, plants growing, etc.). Furthermore, the search query may include other types of information. For example, the search query may specify an intended platform for the document (e.g., Instagram, PowerPoint, etc.), a style or design (e.g., vintage, retro, modern etc.) or an overall theme.

In some implementations, the search query 136 also includes the type of visual asset the user is interested in. For example, the search query 136 may include the phrase "videos of erupting volcanoes" or "templates for birthday invitations". To ensure such search queries are processed accurately, the application via which the search query 136 is submitted may preprocess the search query 136 by determining if the search query 136 contains keywords that indicate the search query includes a request for specific types of visual assets. In some implementations, preprocessing the search query 136 is done via one or more NLP algorithms. In some configurations, the preprocessing operations is performed by the content retrieval engine 114 or another element of the system. Once words or phrases related to the type of visual asset desired are identified, those words or phrases may be removed from the search query 136 before the search query 136 is transmitted. The request for particular types of visual asset is then submitted as part of the additional data 138. In some implementations, even if the search query 136 itself does not include a request for specific types of data, the application via which the request is submitted may have specific requirements or restrictions. For example, the application may only be able to process (e.g., insert) certain types of visual assets into documents. In another example, the application has quality and/or size restrictions for visual assets that can be utilized by the application. In yet another example, the application has threshold requirements with respect to the likelihood of the visual asset being a match for the search query 136. For example, the application may specify that only assets that are more likely than a predetermined threshold (e.g., above 95%) to be a match for the search query 136 should be returned. These requirements and restrictions are included in the additional data 138 which is transmitted from the application to the content retrieval engine 114. In some implementations, the additional data 138 is included and/or transmitted with the search query 136.

The search query 136 is received by the query representation model 178 for processing. The query representation model 178 is a trained ML model for encoding different parts of the search query 136 into embeddings. To enable conversion of different types of inputs (e.g., text, image, template), the query representation model 178 may include a plurality of representation models, one for each type of query. For example, the query representation model 178 may include a text representation model and one or more visual representation models for different types of visual inputs (e.g., images, icons, illustrations, templates, etc.). To enable processing of multimodal input queries such as templates, the query representation model 178 may also include a parsing unit for parsing such multimodal inputs into the different types of content that make up the multimodal document. In an example, each type of input query is converted to a multi-dimensional vector space (e.g., 256 dimensions). The query representation model 178 encodes the search query 136 in a similar manner as that of the asset representation models 164 such that the query representations correspond to the embedding representations of the asset representation library 174. In some implementations, the query representation models 178 include two types of query representation models, one model for converting the search query 136 into representations that correspond with the asset representations and another model that converts the search query 136 into representations that correspond with the domain-specific representations. The two different types of representations are then used by the domain-specific similarity determination module 180 and asset similarity determination module 182 to measure the similarity between the search query and the assets as well as the similarity between the search query and the domain-specific data of the assets.

In some implementations, once the search query 136 is converted to vector embeddings that correspond with the asset representations, the embeddings are transmitted to a tensor generation unit for conversion into tensors and a tensor summarization unit for summarizing the assets to correspond with the format of the asset representations. The generated and/or summarized tensors are then transmitted to the asset similarity determination module 182 for comparison with the asset representations. In some implementations, the asset representations are retrieved from the asset representation library 176 and compared with the query representations using cosine similarity measurements. This may be done by using the cosine vector similarity metric to estimate the degree of similarity between a query representation (e.g., a query tensor) and a candidate asset representation (e.g., candidate tensor) on a −1 (highly irrelevant) to a +1 (highly relevant) scale. This results in generating a number of similarity scores for the assets in the asset representation library. In some implementations, similarity scores are generated for a subset of the assets in the asset representation library 174. In alternative implementations, similarity scores are generated for all the assets in the asset representation library 174.

Additionally, the domain-specific similarity determination module 180 retrieves the domain asset representations from the domain asset representation library 176 and compares those representations to the query representations generated for domain-specific similarity measurement. This may be done by using the cosine vector similarity metric to estimate the degree of similarity between a query representation and a candidate domain-specific representation on a −1 (highly irrelevant) to a +1 (highly relevant) scale. This results in a number of similarity scores for the assets in the asset representation library 174. In some implementations, similarity scores are generated for a subset of the assets in the asset representation library 174. In alternative implementations, similarity scores are generated for all the assets in the asset representation library 174.

In addition to generating similarity scores based on the content of the assets and the domain-specific data associated with the assets, the content retrieval engine 114 makes use of a keyword matching module 184 to further ensure that the results are domain-specific and correspond with the user's intent. The keyword matching module 184 performs a keyword matching between the keywords in the search query 136 and keywords in the domain-specific data 168 of the assets. In some implementations, the keyword matching module 184 generates a similarity (e.g., matching) score between the domain-specific data of an asset in the asset library 150 and the search query on a 0 to 1 scale. In some implementations, similarity scores are generated for a subset of the assets in the asset library 150. In alternative implementations, similarity scores are generated for all the assets in the asset library 150.

Once separate similarity scores have been generated by the domain-specific similarity determination module 180, asset similarity determination module 182 and keyword matching module 184, the different scores are provided to the aggregation and ranking module 186 for score aggregation and ranking. The aggregation and ranking module 186 may determine if the similarity scores are in different scales and if so, apply a normalizing technique to normalize the scores to the same scale. In an example, the similarity scores from the domain-specific similarity determination module 180 and asset similarity determination module 182 are normalized to a 0 to 1 range to correspond with the similarity scores generated by the keyword matching module 184. Once, the similarity scores have been normalized, they are aggregated and/or weighted to generate total similarity scores. Aggregation may involve taking an average of the similarity scores for all assets for which similarity scores have been generated. In some implementations, predetermined weights are applied to similarity scores from different modules. For example, predetermined weights are applied to similarity scores generated by the domain-specific similarity determination module 180, asset similarity determination module 182 and/or keyword matching module 184 to increase or decrease their importance in the aggregate similarity score. The predetermined weights may be determined by a user or may be automatically assigned based on a variety of parameters. For example, a developer may determine that keyword matching in a presentation application is very important in generating accurate search results and as such may assign a higher weight to similarity scores generated by the keyword matching module 184.

The aggregation and ranking module 186 then ranks the candidate assets according to their aggregate similarity scores. Some of the most highly ranked matches are then selected as the search results. In some implementations, the aggregation and ranking module 186 selects candidate assets whose similarity score exceeds a threshold similarity measure as the search results. In some implementations, the aggregation and ranking module 186 takes the additional data 138 into account to retrieve assets that satisfy the requirements of the additional data 138. For example, when the additional data 138 specifies only one type of asset for retrieval (e.g., templates), the aggregation and ranking module 186 selects search results that are of the specified type. Thus, the aggregation and ranking module 186 may treat the requirements set forth in the additional data 138 as tunable parameters that enable the aggregation and ranking module 186 to dynamically select the underlying asset to achieve the required composition of assets in the retrieved results. As such, the aggregation and ranking module 186 may be a dynamic component that adapts to the client application requirements at runtime. Once the search results are filtered and selected, assets corresponding to the selected asset representations are retrieved from the visual asset library 150 and transmitted as the output assets 188 to the application that submitted the search query 136. In some implementations, a link to the selected assets is provided to the application which can in turn use the link to retrieve the output assets 188.

FIG. 1D depicts how one or more ML models used by the content retrieval engine 114, asset representation engine 118 and domain-specific data representation engine 102 are trained by using the training mechanism 116. The training mechanism 116 may use labeled training datasets stored in the data store 122 to provide initial training to the asset representation models 164, query representation models 178, and domain-specific data representation models 170. In some implementations, a training dataset which includes pairs of candidate assets and textual descriptions (e.g., one or more keywords or phrases for each type of content within the candidate asset) are used to train the query representation models 178 and asset representation models 164 in conjunction with each other. For example, for a candidate template having images, text portions, icons, and illustrations, textual descriptions are paired with each of the images, text portions, icons, and illustrations within the template to train the models.

In some implementations, to provide ongoing training, the training mechanism 116 uses training datasets received from each of the ML models. Furthermore, data may be provided from the training mechanism 116 to the data store 122 to update one or more of the training datasets in order to provide updated and ongoing training. Additionally, the training mechanism 116 may receive training data such as knowledge from pre-trained mechanisms. The models are initially trained in an offline phase. Once the models are trained, ongoing training or adding of new candidate assets can be done in a zero-shot unsupervised manner that does not require labeling.

Figure 2:
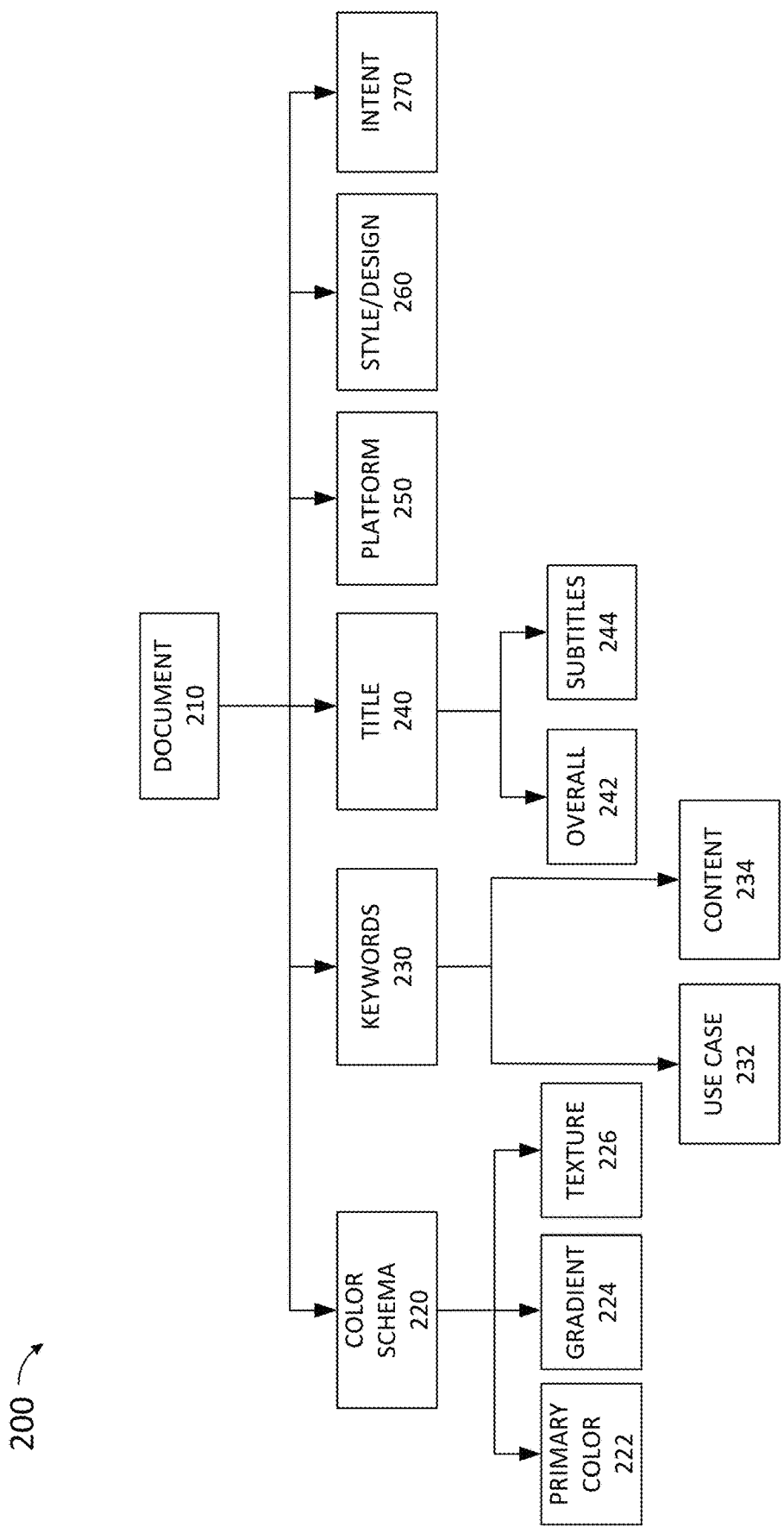
FIG. 2 depicts is an example information schema for providing domain-specific knowledge about a document.

FIG. 2 depicts an example information schema 200 for providing domain-specific knowledge about a document. An information schema such as the information schema 200 may be set by a developer or administrator of an application such that when a new document such as document 210 is being added to an asset library associated with the application, the creator or the person adding the new document provides the information requested in the information schema, before the document is added to the asset library. For example, before a user adds a new design template to a templates library, the user is presented with a form including multiple fields. The fields enable the user to provide information about various aspects of the new document.

The information schema may include fields relating to keywords associated with the document, a color scheme of the document, a title for the document, intended use of the document and the like. One or more fields of the form have a predetermined set of selectable inputs (e.g., a dropdown menu to select from) to choose from. Other fields of the form enable the user to provide a desired response (e.g., input box for entering a response).

The information schema 200 of document 210 includes a color schema 220, keywords 230, title 240, platform 250, design/style 260 and intent 270. The color schema 220 has three subfields primary color 222, gradient 224, and texture 226. Thus, by using the color schema 220, the user can select a primary color 222, a gradient 224 and a texture 226, for the document 210. Similarly, the keywords 230 can have a subfield that enables the user to provide a user case 232 (e.g., in a presentation document, for a marketing flyer, etc.) and content 234 to provide keywords about both potential uses of the document 210 and the content of the document 210 (e.g., birthday, dogs, mountains, etc.). Furthermore, a user can provide an overall title 242 and subtitles 244 for the document 210. Additionally, the platform field 250 can be used to provide an intended platform (e.g., Instagram, etc.) for the user of the document 210. The style/design 260 can be used to specify a particular design or style (e.g., modern, vintage, etc.) for the document (210). Still further, the intent 270 enables the user to provide an intended use (e.g., for use in a birthday invitation, etc.) for the document 210. In this manner, a predefined information schema is used to collect domain-specific expert knowledge about documents in the asset library, such that search results are tailored to specific characteristics of the document.

In some implementations, different applications (e.g., different domains) have different information schemas. For example, a presentation template may have different characteristics and information associated with it than a template created for an application specific to creating marketing materials. As such, a separate and/or different information schema is created for different domains. Creators may be required or encouraged to fill out the fields associated with the information schema to be able to add their documents to the asset library.

Figure 3:
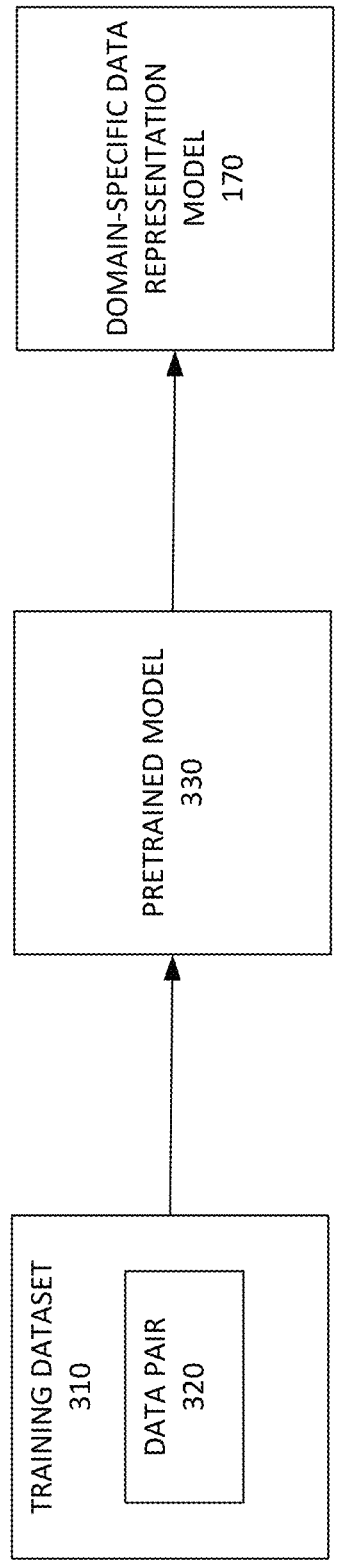
FIG. 3 depicts an example process for training an ML model to identify associations between keywords in a search query and domain-specific data.

To enable an ML model to identify associations between keywords in a search query and the domain-specific data provided according to the information schema, the ML model is trained using data pairs. FIG. 3 depicts an example process for training an ML model to identify associations between keywords in a search query and domain-specific data. A domain-specific data representation model 170 is trained using a training dataset 310. The training dataset 310 includes pairs of domain specific terms (e.g., sentences, phrases, keywords, etc.). For example, the data pair 320 includes pairs of related domain-specific sentences. The data pair 320 includes a number of positive pairs and a number of negative pairs. Each sample may be either a positive or negative pair of sentences/words or a sentence-word pair that contains a domain specific association, e.g., (modern style, simplistic functional design). The training dataset 310 is derived from the domain-specific data associated with assets of an asset library. For example, the training dataset 310 may be extracted from domain-specific human annotations. In one implementation, the dataset 310 includes about 2 million scenario-specific positive and negative sentence pairs.

The training dataset 310 is applied to a pretrained model 330. In some implementations, the pretrained model 330 is a Turing embedding model. For example, the pretrained model 330 may be a Turing T-NLRv3 model. The pretrained model 330 is finetuned with the data pairs 320 via a contrastive finetuning strategy. A data pair 320 includes a domain-specific triplet with the association (e.g., modern style, simplistic functional design, 1), where 1 indicates a positive association and −1 indicates a negative association (p1, p2, s). By using the contrastive strategy, the pretrained model 330 is finetuned to identify associations between terms used to describe assets (domain-specific human knowledge). The resulting model is a trained domain-specific data representation model 170 which can convert domain-specific data into domain embeddings that can later be used to quickly identify associations between search queries and domain-specific data.

The training of the domain-specific representation model 170 is performed in an offline stage. Once the model is trained, then the domain-specific representation model 170 is used in another offline stage to convert the domain-specific data associated with assets of an asset library into embedding vectors, which are then stored in the asset library for future use. Then, during an online phase, the embeddings are used to quickly identify associations between terms used in a search query and the embeddings.

The modular construction of model architecture used in this disclosure, both in terms of separate computation and different phases of training, converting data to embeddings and online usage, provides significant advantages for operating, analyzing, maintaining, and periodically updating the underlying models. For example, each of the models may be independently updated to incorporate new features.

Figure 4:
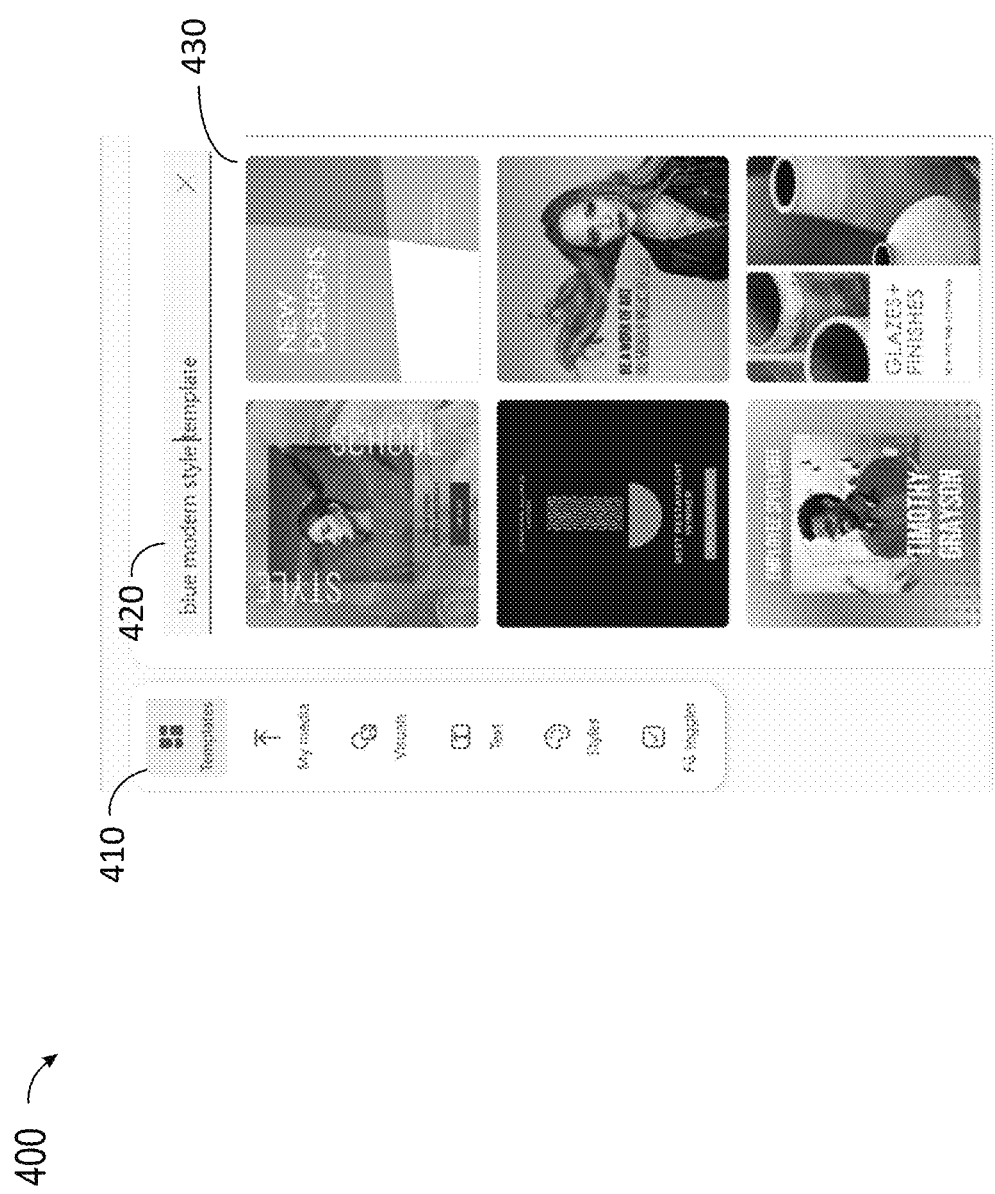
FIG. 4 depicts an example GUI screen of an application or service that provides multimodal content retrieval capabilities using domain-specific knowledge.

FIG. 4 depicts an example GUI screen 400 of an application or service that provides multimodal content retrieval capabilities using domain-specific knowledge. GUI screen 400 displays an example screen of a designer application for designing a document (e.g., a flier, card, presentation slide, marketing material, etc.). GUI screen 400 includes a toolbar menu 410 containing various menu options for performing different tasks in the application. For example, the toolbar menu 410 provides options for the user to choose the type of document they wish to search for and/or to choose the type of input query they wish to submit (e.g., text, image, template, or a combination of two or more).

The GUI screen 400 also includes a UI element 420 for entering a search query. The UI element 420 functions as a search input box to input a text query for conducting a search of available assets. In other examples, the UI element 420 may offer options for attaching an image, or other type of document as a search query. In some implementations, the UI element 420 allows the user to enter a text segment and attach one or more documents to submit a combination of search query inputs. Furthermore, the UI element 420 enables the user to enter other requirements into the input box. For example, the user may enter the type of document desired (e.g., images, templates, icons, etc.). In another example, the user can enter the style of the search results (e.g., modern style, etc.).

Once the user enters a search query into the input box 420, they can utilize a UI element (not shown) or the enter key on a keyboard to submit the search request. The application then utilizes a local content retrieval engine or transmit a request to a global content retrieval engine to perform a search for the requested assets. The search is performed, as discussed above, and the search results are provided to the application. Because the technical solution utilizes domain-specific knowledge in addition to semantic knowledge of assets, the search is able to provide results that are relevant to queries such as the search query displayed in GUI screen 400. That is because while a general-purpose neural model cannot interpret the specific information needed in the query to provide blue templates that have a specific design style, domain-specific knowledge provided by experts (e.g., designer knowledge) enables the technical solution to quickly identify search results that satisfy the user's requirements.

Once the results are received, the application displays the search results in a screen portion 430 of the GUI screen 400. As depicted, the search results may include multimodal documents (e.g., templates). Other types of assets may also be provided as search results. A scroll bar may be provided for scrolling through the search results when the results cannot be displayed in the available screen space. The search results are displayed in an order in which they were ranked based on their similarity score. It should be noted that while a UI element 420 is displayed in GUI Screen 400 for entering a search query and the search results are displayed in the screen portion 430, many other type of UI elements may be utilized for these purposes. For example, the search results may be displayed in a pop-up menu that appears over the GUI screen 400. The user may select one or more of the displayed search results by clicking on the desired search result. Upon selection, the selected search result may be opened in a content pane for use and editing. It should be noted that while GUI screen 400 includes a search input box 420, in some implementations, search results are provided automatically as recommendations without an explicit user request. By using domain-specific knowledge, the search results provided are tailored to the user's specified requirements (e.g., style, intended use, intended platform, color scheme, etc.).

Figure 5:
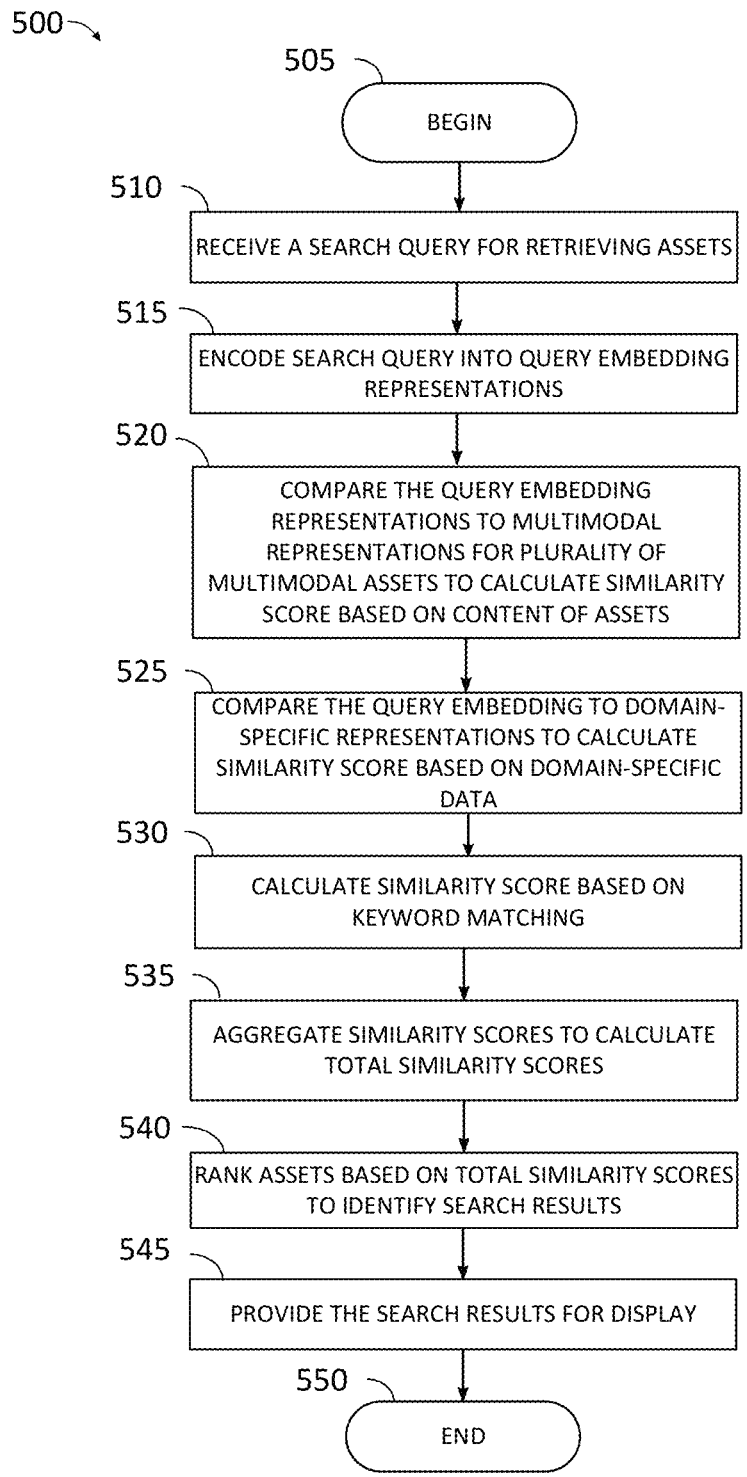
FIG. 5 is a flow diagram depicting an example method for using domain specific knowledge in intelligently retrieving assets based on a query.

FIG. 5 is a flow diagram depicting an exemplary method 500 for using domain specific knowledge in intelligently retrieving assets based on a query. One or more steps of the method 500 may be performed by a content retrieval engine such as the content retrieval engine 114 of FIGS. 1A-1B or by an application such as applications 112/134 of FIGS. 1A-1B. The method 500 begins, at 505, and proceeds to receive a search query for retrieving assets, at 510. This may occur, for example, when a user submits a search query input via a UI of an application or service that provides asset retrieval. The search query includes one or more keywords, images, templates, and/or other multimodal documents and is provided via a user interface of an application running on a client device. Once received, the search query is transmitted via a network to a content retrieval engine.

Once the search query is received by a content retrieval engine, the data within the search query may be encoded into query embedding representations, at 515. This is done by utilizing a trained query representation ML model that converts data into embeddings. The embeddings may then be compared to multimodal tensor representations for a plurality of candidate multimodal assets to calculate similarity scores for a plurality of the candidate multimodal assets, at 520. This may involve first retrieving multimodal tensor representations that have previously been generated from candidate multimodal assets.

Additionally, the query embedding (e.g., this may be generated by a different representation model) is compared with domain-specific representations of the candidate assets to calculate a second similarity score for a plurality of the candidate multimodal assets, at 525. The second similarity score identifies similarities between terms in the search query and domain-specific data of the candidate assets. Furthermore, a third similarity score is calculated for the plurality of the candidate multimodal assets, at 530, based on keyword matching of the search query and the domain-specific data.

The three similarity scores are then aggregated, at 535, to calculate final similarity scores for the plurality of candidate assets. Aggregation may involve normalizing the similarity scores to the same numeral range and/or assigning a weight to one or more of types of the similarity scores. The candidate multimodal assets are then ranked based on the total similarity scores, at 540, to identify search results based on the rankings. One or more of the candidate multimodal assets are identified as search results, based on the ranking. In an example, multimodal assets having similarity scores that are higher than a given threshold are selected as the results. In another example, the top few (e.g., candidate assets having the top 10 similarity scores) are selected. The identified search results are then provided for display to the application from which the search query was received, at 545, before method 500 ends, at 550.

Figure 6:
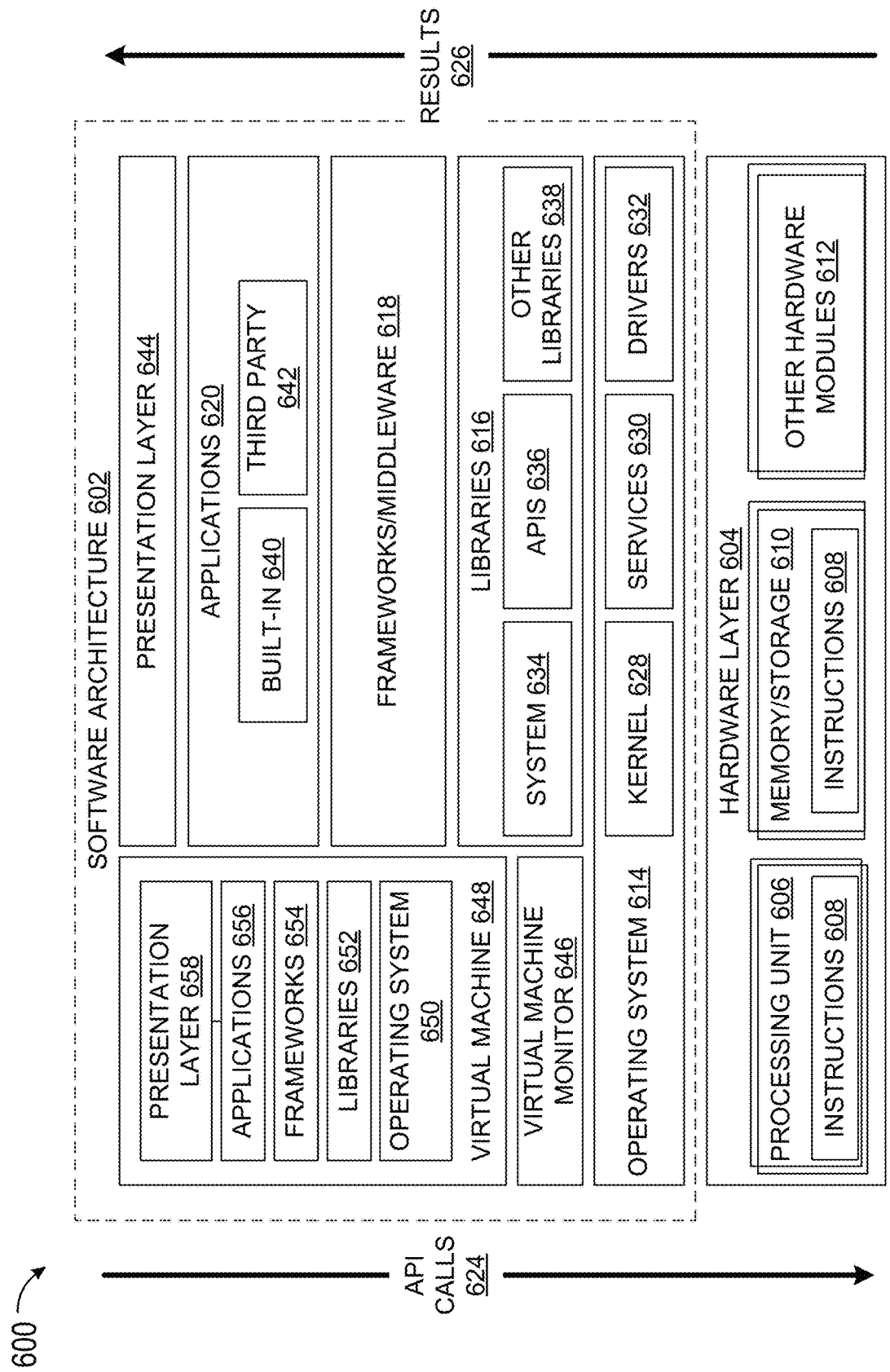
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine depicted in block diagram 700 of FIG. 7, for example). The virtual machine 648 may be hosted by a host OS (for example, OS 714) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
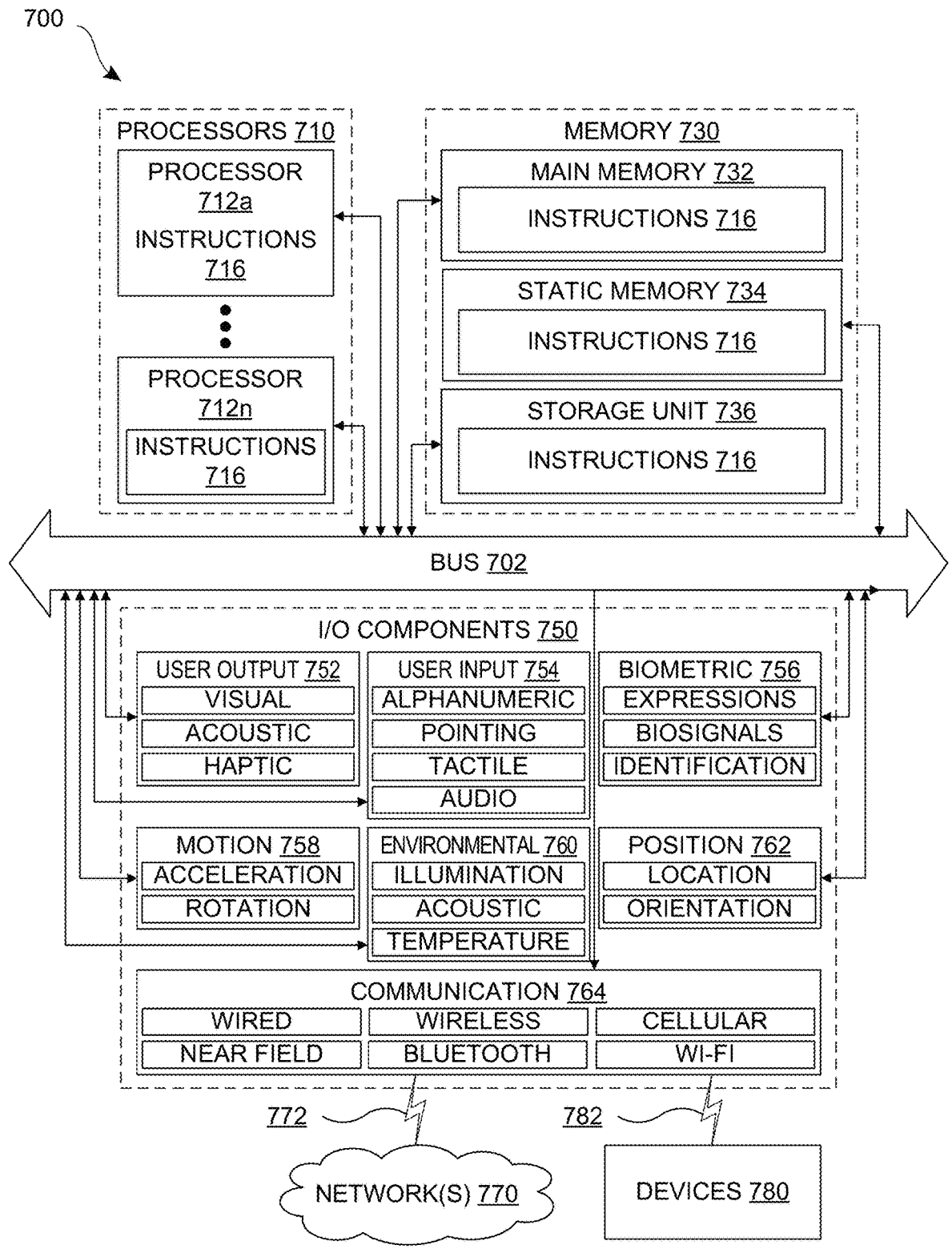
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-7) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
  a processor; and
  a memory in communication with the processor, the memory comprising executable instructions that, when executed by the processor, cause the data processing system to perform functions of:
  receiving a search query for searching for one or more multimodal assets from among a plurality of candidate multimodal assets;
  encoding the search query into one or more query representations via a trained query representation machine-learning (ML) model;
  comparing the one or more query representations to a plurality of multimodal representations to calculate a first similarity score for one or more of the plurality of the candidate multimodal assets, each of the plurality of multimodal representations being a representation of one of the plurality of candidate multimodal assets;
  comparing the one or more query representations to a plurality of domain-specific representations to calculate a second similarity score for one or more of the plurality of the candidate multimodal assets, the domain-specific representations being representations of domain-specific data associated with one or more of the plurality of the multimodal representations;
  calculating a third similarity score for one or more of the plurality of the candidate multimodal assets based on keyword matching between the domain-specific data and one or more terms in the search query;
  aggregating the first, second and third similarity scores to calculate a total similarity score for one or more of the plurality of candidate multimodal assets;
  ranking the plurality of candidate multimodal assets based on the total similarity scores to identify one or more of the plurality of candidate multimodal assets as search results for the search query; and
  providing the identified one or more of the plurality of the candidate multimodal assets for display as the search results.

Item 2. The data processing system of item 1, wherein one or more of the plurality of candidate multimodal assets include a plurality of elements.

Item 3. The data processing system of any of items 1 or 2, wherein the domain-specific data is human-provided annotations for one or more of the multimodal assets.

Item 4. The data processing system of item 3, wherein the domain-specific data is provided in accordance with a predetermined information schema associated with assets in a specific domain.

Item 5. The data processing system of item 4, wherein a user adding an asset to an asset library containing multimodal assets is required to submit the domain-specific data in accordance with the information schema.

Item 6. The data processing system of item 3, wherein the domain-specific data is stored as metadata for the one or more of the multimodal assets.

Item 7. The data processing system of item 3, wherein the domain-specific data relates to assets in a specific application.

Item 8. The data processing system of any preceding item, wherein the executable instructions, when executed by the processor, further cause the data processing system to perform functions of:
providing the plurality of candidate multimodal assets to a trained asset representation ML model to generate the representation for each of the plurality of elements; and
receiving the representation for each of the plurality of elements as an output from the trained asset representation model.

Item 9. The data processing system of any preceding item, wherein the executable instructions, when executed by the processor, further cause the data processing system to perform functions of:
providing the domain-specific data to a trained domain-specific representation ML model to generate the representation for each of the domain-specific data; and
receiving the representation for each of the domain-specific data as an output from the trained domain-specific representation model.

Item 10. The data processing system of item 9, wherein the trained domain-specific representation ML model is trained using a training dataset that includes pairs of domain-specific data.

Item 11. A method for retrieving one or more multimodal assets using domain-specific knowledge comprising:
receiving a search query for searching for one or more multimodal assets from among a plurality of candidate multimodal assets, the search query including one or more search terms;
encoding the search query into a first query representation via a first trained query representation machine-learning (ML) model and a second query representation via a second trained query representation ML model;
comparing the first query representation to a plurality of multimodal representations to calculate a first similarity score for one or more of the plurality of the candidate multimodal assets, each of the plurality of multimodal representations being a representation of one of the plurality of candidate multimodal assets;
comparing the second query representation to a plurality of domain-specific representations to calculate a second similarity score for one or more of the plurality of the candidate multimodal assets, the domain-specific representations being representations of domain-specific data associated with one or more of the plurality of the multimodal representations;
calculating a third similarity score for one or more of the plurality of the candidate multimodal assets based on keyword matching between the domain-specific data and the one or more search terms in the search query;
aggregating the first, second and third similarity scores to calculate a total similarity score for each of the plurality of candidate multimodal assets;
ranking the plurality of candidate multimodal assets based on the total similarity scores to identify one or more of the plurality of candidate multimodal assets as search results for the search query; and
providing the identified one or more of the plurality of the candidate multimodal assets for display as the search results.

Item 12. The method of item 11, wherein aggregating the first, second and third similarity scores to calculate the total similarity score includes normalizing at least one of the first, second and third similarity scores.

Item 13. The method of any of items 11 or 12, wherein aggregating the first, second and third similarity scores to calculate the total similarity score includes assigning a weight to at least one of the first, second and third similarity scores.

Item 14. The method of any of items 11-13, wherein the domain-specific data is provided in accordance with a predetermined information schema associated with assets in a specific domain.

Item 15. The method of any of items 11-14, further comprising:
providing the plurality of candidate multimodal assets to a trained asset representation ML model to generate the representation for each of the plurality of elements; and
receiving the representation for each of the plurality of elements as an output from the trained asset representation model.

Item 16. The method of any of items 11-15, further comprising:
providing the domain-specific data to a trained domain-specific representation ML model to generate the representation for each of the domain-specific data; and
receiving the representation for each of the domain-specific data as an output from the trained domain-specific representation model.

Item 17. The method of item 16, wherein the trained domain-specific representation ML model is trained using a training dataset that includes pairs of domain-specific data.

Item 18. A non-transitory computer readable medium on which are stored instructions that, when executed, cause a programmable device to perform functions of:
receiving a search query for searching for one or more multimodal assets from among a plurality of candidate multimodal assets;
encoding the search query into one or more query representations via a trained query representation machine-learning (ML) model;
comparing the one or more query representations to a plurality of multimodal representations to calculate a first similarity score for one or more of the plurality of the candidate multimodal assets, each of the plurality of multimodal representations being a representation of one of the plurality of candidate multimodal assets;
comparing the one or more query representations to a plurality of domain-specific representations to calculate a second similarity score for one or more of the plurality of the candidate multimodal assets, the domain-specific representations being representations of domain-specific data associated with one or more of the plurality of the multimodal representations;
calculating a third similarity score for one or more of the plurality of the candidate multimodal assets based on keyword matching between the domain-specific data and one or more terms in the search query;

aggregating the first, second and third similarity scores to calculate a total similarity score for one or more of the plurality of candidate multimodal assets;

ranking the plurality of candidate multimodal assets based on the total similarity scores to identify one or more of the plurality of candidate multimodal assets as search results for the search query; and providing the identified one or more of the plurality of the candidate multimodal assets for display as the search results.

Item 19. The non-transitory computer readable medium of item 18, wherein the domain-specific data is human-provided annotations for one or more of the multimodal assets and the domain-specific data is provided in accordance with a predetermined information schema associated with assets in a specific domain.

Item 20. The non-transitory computer readable medium of any of items 18 or 19, wherein the instructions when executed, further cause a programmable device to perform functions of:

providing the domain-specific data to a trained domain-specific representation ML model to generate the representation for each of the domain-specific data; and receiving the representation for each of the domain-specific data as an output from the trained domain-specific representation model.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

In the foregoing detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:

a processor; and a memory in communication with the processor, the memory comprising executable instructions that, when executed by the processor, cause the data processing system to perform:

receiving, via a query representation model, a multimodal search query for searching for one or more multimodal assets from among a plurality of candidate multimodal assets, wherein a multimodal asset contains two or more different types of content including graphic or image content and each of the candidate multimodal assets has a corresponding multimodal representation and a domain-specific representation, the domain-specific representation representing domain-specific knowledge for the corresponding candidate multimodal asset;

parsing, via the query representation model, the multimodal search query to identify from multimodal content of the search query a first content type and a second content type in the search query, the second content type being a graphic or image content type;

transmitting the first content type to a first representation machine-learning (ML) model to generate a first set of vector embeddings;

transmitting the second content type to a second representation ML model to generate a second set of vector embeddings;

transmitting the first and second sets of vector embeddings to a tensor generation unit to generate tensors based on the first and second sets of vector embeddings and to output a query tensor representation;

comparing the query tensor representation to a plurality of the multimodal representations to identify a set of candidate multimodal assets matching the search query;

reducing the set of candidate multimodal assets matching the search query by comparing the plurality of domain-specific representations to the search query; and based on the reduced set of candidate multimodal assets, providing the candidate multimodal assets for display as search results to the search query.

2. The data processing system of claim 1, wherein the domain-specific knowledge comprises human-provided annotations for one or more of the multimodal assets.

3. The data processing system of claim 2, wherein the domain-specific knowledge is provided in accordance with a predetermined information schema associated with assets in a specific domain.

4. The data processing system of claim 3, wherein a user adding an asset to an asset library containing multimodal assets is required to submit the domain-specific knowledge in accordance with the information schema.

5. The data processing system of claim 2, wherein the domain-specific knowledge relates to assets in a specific application.

6. The data processing system of claim 1, wherein the executable instructions, when executed by the processor, further cause the data processing system to perform:

providing the plurality of candidate multimodal assets to a trained asset representation ML model to generate the multimodal representation for each of the candidate multimodal assets; and receiving the multimodal representation for each of the plurality of candidate multimodal assets as an output from the trained asset representation ML model.

7. The data processing system of claim 1, wherein the executable instructions, when executed by the processor, further cause the data processing system to perform:

providing the domain-specific knowledge to a trained domain-specific representation ML model to generate the domain-specific representation for each of the domain-specific knowledge; and receiving the domain-specific representation for each of the plurality of candidate multimodal assets as an output from the trained domain-specific representation ML model.

8. The data processing system of claim 7, wherein the trained domain-specific representation ML model is trained using a training dataset that includes pairs of domain-specific knowledge and an associated domain-specific representation.

9. A method for retrieving one or more multimodal assets using domain-specific knowledge comprising:

receiving, via a query representation model, a multimodal search query for searching for one or more multimodal assets from among a plurality of candidate multimodal assets, wherein a multimodal asset contains two or more different types of content including graphic or image content and each of the candidate multimodal assets has a corresponding multimodal representation and a domain-specific representation, the domain-specific representation representing domain-specific knowledge for the corresponding candidate multimodal asset;

parsing, via the query representation model, the multimodal search query to identify from multimodal content of the search query a first content type and a second content type in the search query, the second content type being a graphic or image content type;

transmitting the first content type to a first representation machine-learning (ML) model to generate a first set of vector embeddings;

transmitting the second content type to a second representation ML model to generate a second set of vector embeddings;

transmitting the first and second sets of vector embeddings to a tensor generation unit to generate tensors based on the sets of vector embeddings and to output a query tensor representation;

comparing the query tensor representation to a plurality of the multimodal representations to identify a set of candidate multimodal assets matching the search query;

reducing the set of candidate multimodal assets matching the search query by comparing the plurality of domain-specific representations to the search query; and based on the reduced set of candidate multimodal assets, providing of the candidate multimodal assets for display as search results to the search query.

10. The method of claim 9, wherein the domain-specific knowledge is provided in accordance with a predetermined information schema associated with assets in a specific domain.

11. The method of claim 9, further comprising:

providing the plurality of candidate multimodal assets to a trained asset representation ML model to generate the multimodal representation for each of the candidate multimodal assets; and receiving the multimodal representation for each of the plurality of candidate multimodal assets as an output from the trained asset representation ML model.

12. The method of claim 9, further comprising:

providing the domain-specific knowledge to a trained domain-specific representation ML model to generate the domain-specific representation for each of the domain-specific knowledge; and receiving the domain-specific representation for each of the plurality of candidate multimodal assets as an output from the trained domain-specific representation ML model.

13. The method of claim 12, wherein the trained domain-specific representation ML model is trained using a training dataset that includes pairs of domain-specific knowledge and an associated domain-specific representation.

14. A non-transitory computer readable medium on which are stored instructions that, when executed, cause a programmable device to perform:

receiving, via a query representation model, a multimodal search query for searching for one or more multimodal assets from among a plurality of candidate multimodal assets, wherein a multimodal asset contains two or more different types of content including graphic or image content and each of the candidate multimodal assets has a corresponding multimodal representation and a domain-specific representation, the domain-specific representation representing domain-specific knowledge for the corresponding candidate multimodal asset;

parsing, via the query representation model, the multimodal search query to identify from multimodal content of the search query a first content type and a second content type in the search query, the second content type being a graphic or image content type;

transmitting the first content type to a first representation machine-learning (ML) model to generate a first set of vector embeddings;

transmitting the second content type to a second representation ML model to generate a second set of vector embeddings;

transmitting the first and second sets of vector embeddings to a tensor generation unit to generate tensors based on the sets of vector embeddings and to output a query tensor representation;

comparing the query tensor representation to a plurality of the multimodal representations to identify a set of candidate multimodal assets matching the search query;

reducing the set of candidate multimodal assets matching the search query by comparing the plurality of domain-specific representations to the search query; and based on the reduced set of candidate multimodal assets, providing of the candidate multimodal assets for display as search results to the search query.

15. The non-transitory computer readable medium of claim 14, wherein the domain-specific knowledge comprises human-provided annotations for one or more of the multimodal assets and the domain-specific knowledge is provided in accordance with a predetermined information schema associated with assets in a specific domain.

16. The non-transitory computer readable medium of claim 14, wherein the instructions when executed, further cause a programmable device to perform:

providing the domain-specific knowledge to a trained domain-specific representation ML model to generate the domain-specific representation; and receiving the domain-specific representation for each of the plurality of candidate multimodal assets as an output from the trained domain-specific representation ML model.

* * * * *